United States Patent [19]

McMichael et al.

[11] Patent Number: 4,752,370
[45] Date of Patent: Jun. 21, 1988

[54] SUPPORTED MEMBRANE/ELECTRODE STRUCTURE COMBINATION WHEREIN CATALYTICALLY ACTIVE PARTICLES ARE COATED ONTO THE MEMBRANE

[75] Inventors: James W. McMichael, Lake Jackson; Robert D. Door, West Columbia, both of Tex.

[73] Assignee: The Dow Chemical Company, Midland, Mich.

[21] Appl. No.: 944,395

[22] Filed: Dec. 19, 1986

[51] Int. Cl.⁴ .................................. C25B 11/20
[52] U.S. Cl. .................... 204/283; 204/282; 204/98; 429/30; 429/33; 429/41
[58] Field of Search ............ 204/282, 283; 429/30, 429/33, 41

[56] References Cited

U.S. PATENT DOCUMENTS

| | | | |
|---|---|---|---|
| 961,549 | 6/1910 | Sperry | 204/283 |
| 3,282,875 | 11/1966 | Connolly et al. | 260/29.6 |
| 3,632,498 | 1/1972 | Beer | 204/290 F |
| 3,909,378 | 9/1975 | Walmsley | 204/98 |
| 4,025,405 | 5/1977 | Dotson et al. | 204/98 |
| 4,061,549 | 12/1977 | Hazelrigg, Jr. et al. | 204/98 |
| 4,065,366 | 12/1977 | Oda et al. | 204/98 |
| 4,116,888 | 9/1978 | Ukihashi et al. | 521/31 |
| 4,123,336 | 10/1978 | Seko et al. | 204/98 |
| 4,126,588 | 11/1978 | Ukihashi et al. | 521/31 |
| 4,142,005 | 2/1979 | Caldwell et al. | 427/126 |
| 4,151,052 | 4/1979 | Goto et al. | 204/95 |
| 4,176,215 | 11/1979 | Molnar et al. | 521/27 |
| 4,178,218 | 12/1979 | Seko | 204/98 |
| 4,192,725 | 3/1980 | Dotson et al. | 204/98 |
| 4,209,635 | 6/1980 | Suhara et al. | 204/98 |
| 4,212,713 | 7/1980 | Suhara et al. | 204/98 |
| 4,214,971 | 7/1980 | Heikel et al. | 204/290 F |
| 4,224,121 | 9/1980 | Dempsey et al. | 204/98 |
| 4,251,333 | 2/1981 | Suhara et al. | 204/98 |
| 4,270,996 | 6/1981 | Suhara et al. | 204/98 |
| 4,272,353 | 6/1981 | Lawrance et al. | 204/283 |
| 4,276,146 | 6/1981 | Coker et al. | 204/266 |
| 4,293,394 | 10/1981 | Darlington et al. | 204/98 |
| 4,299,674 | 11/1981 | Korach | 204/98 |
| 4,299,675 | 11/1981 | Korach | 204/98 |
| 4,315,805 | 2/1982 | Darlington et al. | 204/98 |
| 4,319,969 | 3/1982 | Oda et al. | 204/98 |
| 4,329,435 | 5/1982 | Kimoto et al. | 521/38 |
| 4,330,654 | 5/1982 | Ezzell et al. | 526/243 |
| 4,337,137 | 6/1982 | Ezzell | 204/252 |
| 4,337,211 | 6/1982 | Ezzell et al. | 260/45 F |
| 4,340,680 | 7/1982 | Asawa et al. | 521/27 |
| 4,345,986 | 8/1982 | Korach | 204/266 |
| 4,357,218 | 11/1982 | Seko | 204/98 |
| 4,358,412 | 11/1982 | Ezzell et al. | 260/968 |
| 4,358,545 | 11/1982 | Ezzell et al. | 521/27 |
| 4,364,815 | 12/1982 | Darlington et al. | 204/283 |
| 4,386,987 | 6/1983 | Covitch et al. | 156/155 |
| 4,389,297 | 6/1983 | Korach | 204/282 |
| 4,394,229 | 7/1983 | Korach | 204/98 |
| 4,416,932 | 11/1983 | Nair | 428/209 |
| 4,417,969 | 11/1983 | Ezzell et al. | 204/252 |

(List continued on next page.)

FOREIGN PATENT DOCUMENTS

0027009  4/1981  European Pat. Off.
2069006A 8/1981  United Kingdom.

*Primary Examiner*—John F. Niebling
*Assistant Examiner*—Kathryn Rubino

[57] ABSTRACT

The invention is a membrane/electrode combination having an electrically conductive screen which has a first and a second face. The first face is substantially flat and the screen has a plurality of openings passing through it. The openings connect the first and the second faces of the screen and occupy up to about 75% of the surface area of each face of the electrically conductive screen. There is also an ion exchange membrane film having a first and a second face. The first face of the membrane film is attached to the first face of the electrically conductive screen, thereby leaving portions of the first face of the membrane film exposed through the openings in the electrically conductive screen. A plurality of catalytically active particles are disposed on the exposed portions of the first face of the membrane film and are in electrical and physical contact with the membrane and with the electrically conductive screen.

25 Claims, 1 Drawing Sheet

U.S. PATENT DOCUMENTS

| | | | |
|---|---|---|---|
| 4,457,822 | 7/1984 | Asano et al. | 204/252 |
| 4,462,877 | 7/1984 | Ezzell | 204/98 |
| 4,465,580 | 8/1984 | Kasuya | 204/290 R |
| 4,469,579 | 9/1984 | Covitch et al. | 204/283 |
| 4,470,889 | 9/1984 | Ezzell et al. | 204/98 |
| 4,478,695 | 10/1984 | Ezzell et al. | 204/98 |
| 4,498,942 | 2/1985 | Asano et al. | 156/151 |
| 4,545,886 | 10/1985 | de Nora et al. | 204/252 |
| 4,610,762 | 9/1986 | Birdwell | 204/1 R |
| 4,650,551 | 3/1987 | Carl et al. | 204/59 R |
| 4,650,711 | 3/1987 | Carl et al. | 428/265 |
| 4,652,356 | 3/1987 | Oda et al. | 204/283 |
| 4,654,104 | 3/1987 | McIntyre et al. | 156/276 |
| 4,655,886 | 4/1987 | Oda et al. | 204/98 |
| 4,655,887 | 4/1987 | Oda et al. | 204/98 |
| 4,661,218 | 4/1987 | Oda et al. | 204/98 |

SUPPORTED MEMBRANE/ELECTRODE STRUCTURE COMBINATION WHEREIN CATALYTICALLY ACTIVE PARTICLES ARE COATED ONTO THE MEMBRANE

BACKGROUND OF THE INVENTION

"M & E" stands for Membrane and Electrode. A M & E is a structure composed of an ion exchange ity of electrically conductive, membrane having a plural catalytically active particles present on one, or both, surfaces of an ion exchange membrane. The electrically conductive, catalytically active particles serve as a particulate electrode when the M & E is used in an electrochemical cell. M & E structures are sometimes called solid polymer electrolyte structures or SPE structures.

"M & E cells" are electrochemical cells employing an M & E structure. Such cells can be operated as an electrolytic cell for the production of electrochemical products, or they may be operated as fuel cells for the production of electrical energy. Electrolytic cells may, for example, be used for the electrolysis of an alkali metal halide such as sodium chloride or for the electrolysis of water.

M & E cells are rather well known in the art and are discussed in detail in the following U.S. Pat. Nos. 4,293,394; 4,299,674; 4,299,675; 4,319,969; 4,345,986; 4,386,987; 4,416,932; 4,457,822; 4,469,579; 4,498,942; 4,315,805; 4,364,815; 4,272,353; and 4,394,229.

In M & E cells, frequently, a gaseous product is produced at the catalytically active particles. The gas bubbles off the catalytically active particles (serving as an electrode) into an electrolyte that contacts the M & E during cell operation. However, the gaseous products that are produced within the pores of the catalytically active particles, or at the catalytically active particle/membrane interface, must diffuse out through the pores of the catalytically active particles before they can bubble into the electrolyte and be removed. Because gases are produced faster than they can escape, they build up within the catalytically active particles or build up at the catalytically active particles/membrane interface and cause a decrease in the efficiency of the operation of the M & E cell. Even worse, some gases permeate the membrane and contaminate the product(s) produced on the other side of the membrane. In chlor-alkali cells, where hydrogen is produced on one side of the membrane and chlorine is produced on the other side of the membrane, hydrogen can permeate the membrane and contaminate the chlorine, or vice-versa. This contamination can be hazardous because of the explosive nature of a chlorine/hydrogen mixture.

The prior art has attempted to minimize the problem of gaseous buildup at the M & E by making porous electrodes for M & E's. See, for example U.S. Pat. No. 4,276,146. Some porous M & E electrodes may be formed by including a pore former, such as sodium chloride, in the catalytically active particles during the M & E preparation process. The sodium chloride is later leached out leaving a porous M & E structure. However, such coatings do not solve the gas diffusion problem because a significant reduction in the hydrogen contamination of the chlorine is not realized. Also, the porous catalytically active particles are fragile, and do not hold up well to the action of gas evolution, which leads to a loss of M & E catalytically active particles.

The present invention provides an M & E which is especially designed to minimize the permeation of gaseous products through the membrane and into the opposing side of the cell, and to improve the electrical efficiency of the cell.

M & E electrode coatings are made using materials that are rather expensive. It would be advantageous to reduce the amount of material used in the M & E electrode without sacrificing the catalytic activity of the coating. The present invention provides a M & E having substantially less catalytic material without sacrificing the catalytic activity of the coating.

In M & E's of the prior art, a woven, window-screen electrically conductive screen was used to support the M & E. However, window screen is not entirely satisfactory because of its uneven surface. When window-screen type electrically conductive screens are pressed into catalytically active particles or the membrane film, some portions of the window-screen penetrates further than other portions of the window-screen. This causes an uneven contact of the window-screen with the electrode and membrane, resulting in uneven transfer of electrical energy across the face of the membrane. In addition, some parts of the membrane are more likely to rupture when the window-screen penetrates the membrane.

Another problem with the use of window-screen electrically conductive screens concerns the protection of the membrane from being torn or ruptured by mattresses (resilient devices) which may be used to hold a current collector against the catalytically active particles on the surface of the membrane. Window-screen does not provide as much protection as is provided by the substantially flat electrically conductive screens used in the present invention.

The present invention provides a support structure for M & E's which minimize most of the problems with using a window-screen type structure.

SUMMARY OF THE INVENTION

The invention is a membrane/electrode combination comprising:

(a) an electrically conductive screen having a first and a second face, wherein at least the first face is substantially flat, said screen having a plurality of openings passing therethrough and connecting the first and the second faces of the screen, said openings occupying up to about 75% of the surface area of each face of the electrically conductive screen;

(b) an ion exchange membrane film having a first and a second face, wherein the first face of the membrane film is attached to the first face of the electrically conductive screen, thereby leaving portions of the first face of the membrane film exposed through the openings in the electrically conductive screen;

(c) a plurality of catalytically active particles disposed on the exposed portions of the first face of the membrane film and in electrical and physical contact with the membrane and with the electrically conductive screen.

DETAILED DESCRIPTION OF THE INVENTION

The basis of the present invention is the discovery that through the use of a substantially flat, particularly designed electrically conductive screen, M & E's can be produced that are far superior in their design and operational stability than M & E's produced using prior art methods. For example, the electrically conductive screens used in the present invention are far superior to window-screen type electrically conductive screens used in the prior art because window-screen type electrically conductive screens are not substantially flat, but have a wavy, woven structure.

The porosity of the layer of catalytically active particles forming the M & E electrode is also very important in allowing gas which is formed during cell operation to escape. The M & E's of the prior art had microporous openings. These worked to a limited extent to provide gases a pathway for escape. However, it has been discovered that macroporous, rather than microporous openings are highly desirable because they provide plenty of room for the gases to escape. The electrically conductive screens used in the present invention allow for the preparation of M & E's which are macroporous, as opposed to the microporous M & E's of the prior art. The macroporous nature of the M & E's of the present invention allow the electrochemical cells in which they are used to operate at a higher efficiency.

The macroporous nature of the present M & E coatings provide significant amounts of open area. This open area provides a space for the removal of gases generated at the catalytically active surface. In addition, the small dimensions of the M & E coatings provide a short pathway for gases that form in the area between the catalytically active particles and the membrane to escape, thus minimizing the gas blockage of the membrane. The pattern of the catalytically active particles is designed so that the pathway for the escape of gases from and around the catalytically active material is thought to have less than the resistance to flow through the membrane. Thus, it is thought to be easier for the gases to escape through and around the catalytically active particles than it is to permeate the membrane and escape into the opposing cell compartment.

The size, shape and thickness of the pattern of catalytically active particles depends upon the type of ion exchange membrane being used. That is, a membrane with a high resistance to gas permeation may allow the use of larger patterns of catalytically active particles, while a membrane having a low resistance to the permeation of gases may require smaller patterns of catalytically active particles. For example in a chlor-alkali electrolytic cell, a bilayer ion exchange membrane having an overall thickness of about 4 mils (0.1 millimeter), which has a layer of polymer having sulfonic ion exchange groups approximately 3½ mils (0.09 millimeter) thick and a layer of polymer having carboxylic ion exchange groups approximately ½ mil (0.01 millimeter) thick preferably have patterns of catalyst having a dimensions of less than about about 1 centimeter in diameter or width. More preferably, however, the patterns of catalytically active particles have diameters or widths of less than about 0.5 centimeters. Most preferably, the patterns of catalytically active particles have diameters or widths of less than about 0.2 centimeters.

Figure 1:
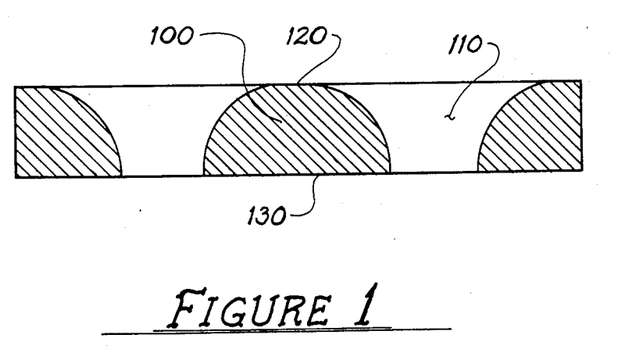
FIG. 1 shows a side view of one type of substantially flat electrically conductive screen that is suitable for use in the present invention.

FIG. 1 shows a side view of one type of electrically conductive screen that is suitable for use in the present invention. The metal 110 has one flat side 120 and one rounded side 120. Although the rounded side 130 has a substantially flat portion. The electrically conductive screen has an opening 100 connecting its two sides.

Figure 2:
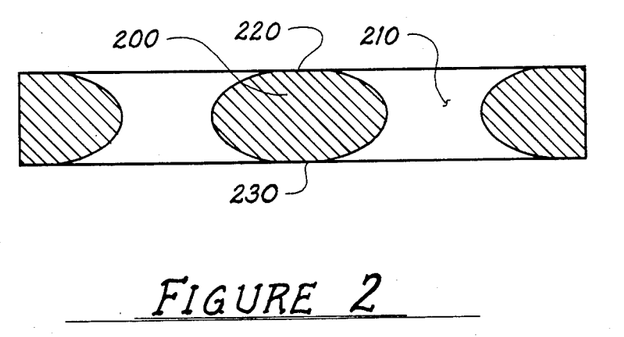
FIG. 2 shows a side view of another type of substantially flat electrically conductive screen that is suitable for use in the present invention.

FIG. 2 shows a side view of another type of electrically conductive screen that is suitable for use in the present invention. The metal 200 has two rounded sides 220 and 230. However, the rounded sides 220 and 230 have substantially flat portions. The electrically conductive screen has an opening 210 connecting its two sides.

Figure 3:
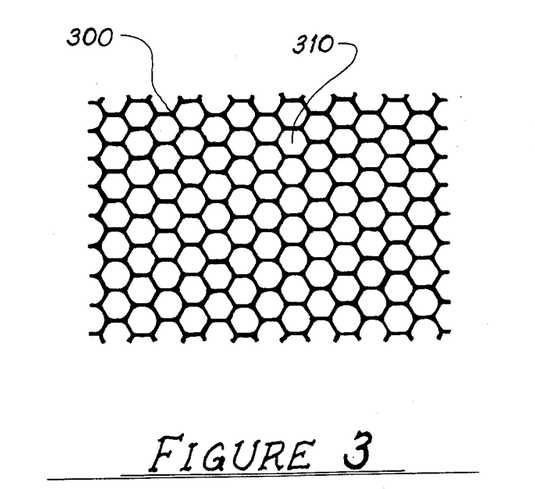
FIG. 3 shows a side view of a section of the substantially flat electrically conductive screen that is suitable for use in the present invention.

FIG. 3 shows a top view of the electrically conductive screen. It has metal 300 and openings 310.

The electrically conductive screen used in the present invention is preferably substantially flat and has a plurality of spaced apart openings. Preferably, the screen is substantially completely flat on at least one surface. The flatness seems to be particularly desirable for forming the M & E article because it makes it possible to form a M & E that has a well-defined, clearly controlled, open area and, likewise, a coated area. The fact that the catalytic coating is placed on the membrane areas not covered by the electrically conductive screen provides excellent electrical contact between the electrically conductive screen and the membrane. The screens are preferably metallic but may be constructed from other materials so long as they are electrically conductive. This method minimizes the amount of catalytic material that is used for forming the M & E and maximizes the area for the escape of gaseous products from the catalytically active particles coating because there is plenty of open area.

It has been found that preferably the electrically conductive screen has from about 25 to about 75% open area. More preferably, the electrically conductive screen has from about 40 to about 60% open area. Most preferably, the electrically conductive screen has from about 45 to about 55% open area. This provides sufficient open area for the gases formed at the M & E to escape.

Optionally, the electrically conductive screen can have no openings around its peripheral edge. This provides a nonporous area where a gasket can be placed when the M & E is assembled with other components to form an electrochemical cell.

An electrically conductive screen that seems to be particularly suitable for use in the present invention is an electroformed, electrically conductive screen having a plurality of openings that are spaced apart from each other.

Electroforming is the process in which metal is electrochemically deposited on a matrix in a photographically determined pattern. When the matrix is removed, the remaining screen is photo-perfect and substantially flat. Because the holes are produced by a buildup of metal around each of them, the perforations have a characteristic arch shape. This shape offers smooth passage of the materials being screened and prevents buildup of deposits. Single-sided electroforming produces essentially conical shaped holes; double-sided electroforming produces bi-conical shaped holes.

The thickness of the screen preferably should not exceed the thickness of the layer of the membrane to which the screen is to be bonded, by more than about 25%. In other words, if the membrane is a bilayer membrane having one layer of sulfonic polymer and another layer of carboxylic polymer, if the screen is to be bonded to the carboxylic layer, the screen thickness should not exceed the thickness of the carboxylic layer by more than 25%. If the screen is too thick, it will penetrate too far into the membrane and will be more likely to be chemically attacked by the chemicals in the opposing compartment of the cell. More preferably, the thickness of the screen does not exceed the thickness of the layer of the membrane to which the screen is to be bonded.

The width or diameter of the layer of catalytically active particles, as it is bonded to the membrane, is preferably less than about one centimeter. More preferably, the width or diameter is less than about 0.5 centimeter, and most preferably the width is less than about 0.2 centimeter. Dimensions larger than these ranges result in increased gas contamination of the products produced in the opposing side of the cell, because the gas finds less resistance in going through the membrane to the opposing side of the cell than it finds in escaping through the catalytically active particles.

Electroformed holes seem to be preferred over punched holes, and holes formed by other means, because the electroformed holes are smooth and do not tear the membrane when they are contacted therewith. Likewise, the electroformed, electrically conductive screens are superior to a woven cloth or a window-screen wire mesh because they are substantially flat and do not unevenly penetrate the membrane when embedded therein.

The shape of the holes in the electrically conductive screen is not critical to the successful operation of the present invention. They may be of almost any shape including circular, oblong, square, rectangular, triangular, etc. Preferably, however, the holes are circular because the result in the formation of circular islands of catalytically active particles, which provide the shortest pathway for the escape of gases, as compared to any other shape.

The M & E structure of the present invention includes embodiments where catalytically active particles and substantially flat electrically conductive screens are bonded to or embedded in one, or both, sides of the membrane. However, the present invention requires that at least one of the electrodes be in the form of a plurality of catalytically active particles contacting the membrane. These plurality of catalytically active particles are what make a catalytically active, electrode. The catalytically active particles can serve, during cell operation, as either a cathode or an anode. Optionally, both electrodes can be catalytically active particles embedded into opposite sides of the membrane. For the purposes of the present discussion, the forms of both electrodes will be described as though they are catalytically active particles and will also be described as if they are separate, conventional electrodes.

Conventional anodes are usually hydraulically permeable, electrically conductive structures made in a variety of shapes and styles including, for example, a screen of expanded metal, perforated plate, punched plate, unflattened diamond shaped expanded metal, or woven metallic wire. Metals suitable for use as anodes include tantalum, tungsten, columbium, zirconium, molybdenum, and preferably, titanium and alloys containing major amounts of these metals.

Optionally the anode may be composed of a plurality of catalytically active particles embedded into the membrane. Materials suitable for use as electrocatalytically active anode materials include, for example, activating substances such as oxides of platinum group metals like ruthenium, iridium, rhodium, platinum, palladium, either alone or in combination with an oxide of a film-forming metal. Other suitable activating oxides include cobalt oxide either alone or in combination with other metal oxides. Examples of such activating oxides are found in U.S. Pat. Nos. 632,498; 4,142,005; 4,061,549; and 4,214,971.

Conventional cathodes are usually hydraulically permeable, electrically conductive structures made in a variety of shapes and styles including, for example, a screen of expanded metal, perforated plate, punched plate, unflattened diamond shaped expanded metal, or woven metallic wire. Metals suitable for use as cathode include, for example, copper, iron, nickel, lead, molybdenum, cobalt, alloys including major amounts of these metals, such as low carbon stainless steel, and metals or alloys coated with substances such as silver, gold, platinum, ruthenium, palladium, and rhodium.

Optionally the cathode may be a plurality of catalytically active particles embedded into the membrane. Materials suitable for use as electrocatalytically active cathode materials include, for example, platinum group metal or metal oxide, such as ruthenium or ruthenium oxide. U.S. Pat. No. 4,465,580 describes such cathodes.

The catalytically active particles, whether used as an anode or as a cathode are preferably finely divided and have a high surface area. For example, in the case of an oxygen or hydrogen electrode fuel cell, platinum black (surface area greater than 25 $m^2$/gram) or high surface area (800–1800 $m^2$/g) platinum on activated carbon powder (average particle size 10–30 microns) are quite suitable for use as the anode and the cathode. In the case of a chlorine cell, an electrode may be prepared in which ruthenium dioxide particles are prepared by thermal decomposition of ruthenium nitrate for 2 hours at 450° C. The resulting oxide may then be ground using a mortar and pestle and the portion which passed through a 325 mesh sieve (less than 44 microns) used to prepare an electrode.

Membranes that are suitable for use in the present invention may be constructed of a fluorocarbon-type material or of a hydrocarbon-type material. Such membrane materials are well known in the art. Preferably, however, fluorocarbon materials are generally preferred because of their chemical stability.

Non-ionic (thermoplastic) forms of perfluorinated polymers described in the following patents are particularly suitable for use in the present invention because they are easily softened by heating and make it easy to bond the membrane to the catalytically active particles and to the flat electrically conductive screen. Membranes which are suitable are described in the following U.S. Pat. Nos. 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695; European patent application No. 0,027,009. Such polymers usually have equivalent weight in the range of from about 500 to about 2000. The membranes can be a single layer or they can be a multilayer membrane. Some of the more useful membranes are bilayer membranes having sulfonic ion exchange groups in one layer and carboxylic ion exchange groups in the other layer.

To allow the substantially flat, electrically conductive screen and the catalytically active particles to be embedded into the fluorocarbon membrane, it is desirable for the fluorocarbon membrane to be in its thermoplastic form. It is in a thermoplastic form when it is made and before it is converted into an ion exchange form. By thermoplastic form, it is meant, for instance, that the membrane has $SO_2X$ pendant groups, where X is $-F$, $-CO_2$, $-CH_3$, or a quaternary amine, rather than ionically bonded $SO_3Na$ or $SO_3H$ pendant groups.

Particularly preferred fluorocarbon materials for use in forming membranes are copolymers of monomer I with monomer II (as defined below). Optionally, a third type of monomer may be copolymerized with I and II.

The first type of monomer is represented by the general formula:

$$CF_2=CZZ' \quad (I)$$

where:

Z and Z' are independently selected from the group consisting of $-H$, $-Cl$, $-F$, or $-CF_3$.

The second type of monomer consists of one or more monomers selected from compounds represented by the general formula:

$$Y-(CF_2)_a-(CFR_f)_b-(CFR_{f'})_c-O-[CF(CF_2X)-CF_2-O]_n-CF=CF_2 \quad (II)$$

where:

Y is selected from the group consisting of $-SO_2Z$, $-CN$, $-COZ$, and $C(R^3f)(R^4f)OH$;

Z is $-I$, $-Br$, $-Cl$, $-F$, $-OR$, or $-NR_1R_2$;

R is a branched or linear alkyl radical having from 1 to about 10 carbon atoms or an aryl radical;

$R^3f$ and $R^4f$ are independently selected from the group consisting of perfluoroalkyl radicals having from 1 to about 10 carbon atoms;

$R_1$ and $R_2$ are independently selected from the group consisting of $-H$, a branched or linear alkyl radical having from 1 to about 10 carbon atoms or an aryl radical;

a is 0–6;
b is 0–6;
c is 0 or 1;
provided a+b+c is not equal to 0;
X is $-Cl$, $-Br$, $-F$, or mixtures thereof when n>1;
n is 0 to 6; and $R_f$ and $R_{f'}$ are independently selected from the group consisting of $-F$, $-Cl$, perfluoroalkyl radicals having from 1 to about 10 carbon atoms Particularly preferred is when Y is $-SO_2F$ or $-COOCH_3$; n is 0 or 1; $R_f$ and $R_{f'}$ are $-F$; X is $-Cl$ or $-F$; and a+b+c is 2 or 3.

The third, and optional, monomer suitable is one or more monomers selected from the compounds represented by the general formula:

$$Y'-(CF_2)_{a'}-(CFR_f)_{b'}-(CFR_{f'})_{c'}-O-[CF(CF_2X')-CF_2-O]_{n'}-CF=CF_2 \quad (III)$$

where:

Y' is $-F$, $-Cl$ or $-Br$;
a' and b' are independently 0–3;
c is 0 or 1;
provided a'+b'+c' is not equal to 0;
n' is 0–6;

$R_f$ and $R_{f'}$ are independently selected from the group consisting of $-Br$, $-Cl$, $-F$, perfluroalkyl radicals having from about 1 to about 10 carbon atoms, and chloroperfluoroalkyl radicals having from 1 to about 10 carbon atoms; and X' is $-F$, $-Cl$, $-Br$, or mixtures thereof when n'>1.

Conversion of Y to ion exchange groups is well known in the art and consists of reaction with an alkaline solution. The membrane may be converted to its ionic form by reacting it with, in the case of $-SO_2F$ pendant groups, 25 weight % NaOH under the following conditions: (1.) immerse the film in about 25 weight percent sodium hydroxide for about 16 hours at a temperature of about 90° C.; (2.) rinse the film twice in deionized water heated to about 90° C., using about 30 to about 60 minutes per rinse. The pendant group is then in the $-SO_3-Na^+$ form. Cations other than $-Na^+$ can be made to replace the $Na^+$ if practical (such as $-H^+$).

Preparation of the supported M & E of the present invention involves a plurality of steps. First, one must select a membrane film and a electrically conductive screen. The flat electrically conductive screen used in the present invention is preferably cleaned or treated in such a way as to assure uniform contact with the membrane. The flat electrically conductive screen can be cleansed by washing with a degreaser or similar solvent followed by drying to remove any dust or oils from the flat, electrically conductive screen. Metallic screens may be acid etched, then washed with a solvent to promote adhesion, if desired, unless the metal is new, in which case degreasing is sufficient.

After being cleaned, the flat electrically conductive screens may be preconditioned by heating or vacuum drying prior to contact with the membrane. Then, the catalytically active particles are coated onto the electrically conductive screen/membrane combination in a manner such that the catalytically active particles pass through the holes in the electrically conductive screen and contact the membrane.

The fact that the first face of the electrically conductive screen is substantially flat minimizes the penetration of the catalytically active particles into the space between the electrically conductive screen and the membrane. In other words, the catalytically active solution/dispersion does not "run" when it is applied to the membrane.

There are a number of suitable ways for depositing the particles onto the membrane. For example, one can form a slurry of the catalytically active particles and paint or spray the slurry onto the membrane. Spraying the solution/dispersion onto the flat electrically conductive screen is used to advantage for covering large or irregular shapes. Pouring the solution/dispersion onto the membrane is sometimes used. Painting the solution/dispersion with brush or roller has been successfully employed. In addition, coatings may be easily applied with metering bars, knives, or rods. Usually, the coatings or films are built up to the thickness desired by repetitive application.

A particularly suitable method for depositing the catalytic particles onto the electrically conductive screen involves forming a solution/dispersion of the catalytically active particles in a dispersant. Preferably, the solvent/dispersant used for suspending the catalytic particles is one which will at least partially dissolve the polymer making up the ion exchange membrane. This tends to give better bonding of the particles to the membrane.

Optionally, and preferably, the solution/dispersion may contain a binder to help hold the catalytically active particles together and bond them to the electrically conductive screen. Preferred binders include a variety of fluoropolymers including such materials as polytetrafluoroethylene, perfluorinated polymers and copolymers, and ionomers. Particularly preferred as a binder is an ionomer having the same or a similar composition as the ion exchange membrane. Examples of the types of ionomers that are suitable for use as a binder are the same as those shown to be suitable for use as the ion exchange membrane, as discussed above. The solvent dispersant discussed above is a solvent for the ion exchange polymer. Thus a solution/dispersion can be formed that contains catalytically active particles, an ion exchange fluoropolymer and a solvent/dispersant. This solution/dispersion helps bond the catalytically active particles together and to the electrically conductive screen.

When a solution/dispersion is prepared, the concentration of the ionomer is preferably from about 4 weight percent to about 20 weight percent. The concentration of the catalytically active particles may be from about 0.1 weight percent and higher. There is no set maximum limit. Since the catalytic activity depends upon the type of catalyst being used, and since all catalysts perform slightly differently, one should experiment with the particular catalyst being used to optimize the catalyst lever. However, when ruthenium oxide is used, levels from about 2 weight percent to about 20 weight percent have been found to be suitable. Optionally an electrically conductive material can be added to the solution/dispersion to increase the electrical conductivity of the catalyst deposited on the membrane. Silver is commonly added, for example, at a level of from about 60 to about 90 weight percent. Other suitable metals for use as the electrically conductive material include such things as nickel, tantalum, platinum and gold.

The preparation of the solution/dispersion is accomplished using the following procedures. First the components are weighed and blended with each other dry. Then sufficient solvent/dispersant is added to cover the dry ingredients. The mixture is then blended in a ball mill for a time period of from about 4 hours to about 24 hours to obtain a uniform mixture. This also gives time for the ionomer to be broken up and at least partially dissolved. This aids in bonding the catalytically active particles together. Then, the mixture is allowed to settle and the excess solvent/dispersant is decanted off. At this point, the mixture usually contains about 25 weight percent solids.

Solvents/dispersants suitable for use in the present invention which are designed to at least partially dissolve the polymer making up the ion exchange membrane should have the following characteristics:

a boiling point less than about 110° C.;

a density of from about 1.55 to about 2.97 grams per cubic centimeter; and a solubility parameter of from greater than about 7.1 to about 8.2 hildebrands.

It has been found that solvents/dispersants represented by the following general formula are particularly preferred provided they also meet the characteristics discussed above (boiling point, density, and solubility parameter):

XCF$_2$—CYZ-X' wherein:

X is selected from the group consisting of —F, —Cl, —Br, and —I;

X' is selected from the group consisting of —Cl, —Br, and —I;

Y and Z are independently selected from the group consisting of —H, —F, —Cl, —Br, —I and —R';

R' is selected from the group of perfluoroalkyl radicals and chloroperfluoroalkyl radicals having from 1 to 6 carbon atoms.

The most preferred solvents/dispersants are 1,2-dibromotetrafluoroethane (commonly known as Freon 114 B 2)

BrCF$_2$—CF$_2$Br and 1,2,2-trichlorotrifluoroethane (commonly known as Freon 113):

ClF$_2$C—CCl$_2$F

Of these two solvents/dispersants, 1,2-dibromotetrafluoroethane is the most preferred solvent/dispersant. It has a boiling point of about 47.3° C., a density of about 2.156 grams per cubic centimeter, and a solubility parameter of about 7.2 hildebrands. 1,2-dibromotetrafluoroethane is thought to work particularly well because, though not directly polar, it is highly polarizable. Thus, when 1,2-dibromotetrafluoroethane is associated with a polar molecule, its electron density shifts and causes it to behave as a polar molecule. Yet, when 1,2-dibromotetrafluoroethane is around a non-polar molecule, it behaves as a non-polar solvent/dispersant. Thus, 1,2-dibromotetrafluoroethane tends to dissolve the non-polar backbone of polytetrafluoroethylene and also the polar pendant groups. The solubility parameter of 1,2-dibromotetrafluoroethane is calculated to be from about 7.13 to about 7.28 hildebrands.

After coating the catalytic particles onto the electrically conductive screen/membrane combination, it is heated to bond the combination together. When the membrane is in a thermoplastic form or in a sodium form, the following conditions may be used for bonding. It may be heated to about 500° F. (260° C.) for a time period of from about 30 seconds to about 1 minute. The time is estimated to be the time necessary to bring the membrane up to the stated temperature. Too low a temperature or too short a time of heating results in the electrically conductive screen not being completely bonded to the membrane. Too long a time results in the metal passing entirely through the membrane and not being located on its surface. Too high a temperature causes the membrane to melt which prevents the proper M & E from being formed. It is sometimes beneficial to heat the electrically conductive screen/membrane combination under pressures of up to about 3.5 kilograms per square centimeter. Pressures greater than about 3.5 kilograms per square centimeter tend to push the membrane completely through the electrically conductive screen. When, however, the membrane is in a hydrogen form, it should not be heated above about 180° C.

To press the electrically conductive screen into the membrane, a heated press is preferably used. Although a variety of procedures may be suitable to use, one that has been found to be particularly useful involves forming a sandwich of the components between two platens, an upper platen and a lower platen. On top of the lower platen is a screen of polytetrafluoroethylene paper, the membrane having the catalytically active particles coated thereon, the electrically conductive screen, another screen of polytetrafluoroethylene paper and finally, the upper platen. This sandwich is then placed in a heated press and heated to about 500° F. (260° C.) for about 90 seconds.

Thickness of the coating may be of almost any desired thickness, however, thickness as low as 20 to 50 microns have been found to work perfectly well. In some instances, coating thickness as low as about 5–10 microns have been found to be suitable.

Since the catalytic coating covers only a portion of the membrane, less catalytically active material is used. Yet, the catalytic activity of the M & E is at least equivalent to the M & E's of the prior art.

It has been discovered that, even though the present invention uses only a portion of the catalytically active particles that would be used in a full coupon M & E, one can reduce the concentration of catalytically active particles even further. For example, a typical solution/dispersion of catalytically active particles contains about 75 weight percent silver, about 16 weight percent ruthenium oxide and about 9 weight percent ionomer. However, using the techniques of the present invention, a solution containing about 83 weight percent silver, about 8 weight percent ruthenium oxide, and about 9 weight percent ionomer, works substantially as well as the one having 16 weight percent ruthenium oxide. This represents a potential savings of approximately one-half of the expensive ruthenium oxide catalyst.

The M & E structure of the present invention is useful in a wide variety of electrochemical cells including, for example, fuel cells for the continuous production of electrical energy; electrolysis cells for the production of chemical products (such as chlorine and caustic from a sodium chloride brine solution or hydrogen and oxygen from water); and batteries for the intermittent production of electrical energy.

EXAMPLE 1

A mixture of about 76 grams of silver particles, about 16 grams of ruthenium oxide particles, and about 8 grams of carboxylic ion exchange fluoropolymer particles were dissolved and suspended in $BrCF_2—CF_2Br$ in a ball mill. First the components were weighed and blended with each other dry. Then sufficient solvent/dispersant was added to cover the dry ingredients. The mixture was then blended in a ball mill for a time period of about 24 hours to obtain a uniform mixture. This also gave time for the ionomer to be broken up and at least partially dissolved. Then, the mixture was allowed to settle and the excess solvent/dispersant was decanted off. At this point, the mixture contained about 25 weight percent solids.

The solution/dispersion was spread onto a sheet of aluminum foil in a layer approximately 20–50 microns thick. The coating was allowed to air dry. Then the coating was sintered for about 5 minutes at a temperature of about 260° C.

An approximately 56 square centimeter sample of an electroformed electrically conductive nickel screen from Perforated Products, Inc., in Brookline, Mass., a division of Veco International Corporation was used. The screen had a plurality of openings 0.029 inch (0.7 millimeters) in diameter evenly distributed across its face. There were a sufficient number of holes to make the screen approximately 50% open. The screen had a thickness of about 0.0028 inch (0.1 millimeters).

A bilayer ion exchange membrane having a fluoropolymer containing sulfonic ion exchange groups in one layer and a fluoropolymer containing carboxylic ion exchange groups in the other layer was obtained. The thickness of the membrane was approximately 4 mils (0.1 millimeter). The carboxylic layer was about 0.5 mils thick (0.01 millimeter) and the sulfonic layer was about 3.5 mils thick (0.09 millimeter). The screen was contacted with the side of the membrane containing the carboxylic ion exchange groups. The other side of the screen was contacted with the catalytically active coating formed on the aluminum foil. The combination was press together at a pressure of about 50 pounds per square inch (3.5 kilograms per square centimeter) at a temperature of about 500° F. (260° C.) for about 30 seconds. The pressure pushed the coating on the aluminum foil through the holes in the screen and onto the membrane. The heat caused the catalytically particles to bond to the membrane. The combination was then removed from the press, allowed to cool, and the coated aluminum foil was removed. This left a membrane having the screen bonded to the membrane. In the open areas of the screen, was the catalytically active particles which had been pressed through the holes in the screen and onto the membrane.

We claim:
1. A membrane/electrode combination comprising:
   (a) an electrically conductive screen having a first and a second face, wherein at least the first face is substantially flat, said screen having a plurality of openings passing therethrough and connecting the first and the second faces of the screen, said openings occupying up to about 75 % of the surface area of each face of the electrically conductive screen;
   (b) an ion exchange membrane film having a first and a second face, wherein the first face of the membrane film is attached to the first face of the electrically conductive screen, thereby leaving portions of the first face of the membrane film exposed through the openings in the electrically conductive screen;
   (c) a plurality of catalytically active particles disposed only on the exposed portions of the first face of the membrane film and in electrical and physcial contact with the membrane and with the electrically conductive screen.

2. The membrane/electrode combination of claim 1 wherein the electrically conductive screen is metallic.

3. The membrane/electrode combination of claim 1 wherein the electrically conductive screen is an electroformed metallic screen.

4. The membrane/electrode combination of claim 1 wherein the electrically conductive screen has from about 40 to about 60% open area.

5. The membrane/electrode combination of claim 1 wherein the electrically conductive screen has from about 45 to about 55% open area.

6. The membrane/electrode combination of claim 1 wherein the screen is nonporous around its peripheral edges.

7. The membrane/electrode combination of claim 1 wherein the thickness of the screen does not exceed the thickness of a layer of the membrane to which the screen is attached by more than about 25%.

8. The membrane/electrode combination of claim 1 wherein the thickness of the screen does not exceed the thickness of a layer of the membrane to which the screen is attached.

9. The membrane/electrode combination of claim 1 wherein the width of the plurality of catalytically active particles disposed on the exposed portions of the first face of the membrane film does not exceed about one centimeter.

10. The membrane/electrode combination of claim 1 wherein the pattern of the catalytically active particles disposed on the exposed portions of the first face of the membrane film has a width that does not exceed about one-half centimeter.

11. The membrane/electrode combination of combinaiton of claim 1 wherein the pattern of the catalytically active particles disposed on the exposed portions of the first face of the membrane film has a width that does not exceed about 0.2 centimeter.

12. The membrane/electrode combination of claim 1 wherein the openings in the screen are one or more shapes selected from the group consisting of circles, oblongs, squares, triangles, and rectangles.

13. The membrane/electrode combination of claim 1 wherein the openings in the screen are circles.

14. The membrane/electrode combination of claim 1 wherein the plurality of catalytically active particles are selected from the group consisting of oxides ruthenium, iridium, rhodium, platinum, palladium, either alone or in combination with an oxide of a film-forming metal and cobalt oxide either alone or in combination with other metal oxides.

15. The membrane/electrode combination of claim 1 wherein the membrane is a fluorocarbon-type material.

16. The membrane/electrode combination of claim 1 wherein the membrane is a hydrocarbon-type material.

17. The membrane/electrode combination of claim 15 wherein the membrane is in its thermoplastic state.

18. The membrane/electrode combination of claim 15 wherein the membrane is a copolymer of a first type monomer and a second type monomer, wherein first type of monomer is represented by the general formula:

$$CF_2=CZZ' \qquad (I)$$

where:

Z and Z' are independently selected from the group consisting of —H, —Cl, —F, or —CF$_3$; and the second type of monomer consists of one or more monomers selected from compounds represented by the general formula:

$$Y-(CF_2)_a-(CFR_f)_b-CF_{f'})_c-O-[CF(CF_2X)-CF_2-O]_n-CF=CF_2 \qquad (II)$$

where:

Y is selected from the group consisting of —SO$_2$Z, —CN, —COZ, and C(R$^3$f)(R$^4$f)OH;

Z is —I, —Br, —Cl, —F, —OR, or —NR$_1$R$_2$;

R is a branched or linear alkyl radical having from 1 to about 10 carbon atoms or an aryl radical;

R$^3$f and R$^4$f are independently selected from the group consisting of perfluoroalkyl radicals having from 1 to about 10 carbon atoms;

R$_1$ and R$_2$ are independently selected from the group consisting of —H, a branched or linear alkyl radical having from 1 to about 10 carbon atoms or an aryl radical;

a is 0–6;

b is 0–6;

c is 0 or 1;

provided a+b+c is not equal to 0;

X is —Cl, —Br, —F, or mixtures thereof when n is 0 to 6; and

R$_f$ and R$_{f'}$ are independently selected from the group consisting of —F, —Cl, perfluoroalkyl radicals having from 1 to about 10 carbon atoms and fluorochloroalkyl radicals having from 1 to about 10 carbon atoms.

19. The membrane/electrode combination of claim 18 wherein Y is —SO$_2$F or —COOCH$_3$; n is 0 or 1; R$_f$ and R$_{f'}$ are —F; X is —Cl or —F; and a+b+c is 2 or 3.

20. The membrane/electrode combination of claim 18 wherein the copolymer also includes a third type of monomer selected from the compounds represented by the general formula:

$$Y'-(CFR_2)_{a'}-CFR_f)_{b'}-CFR_{f'})- \\ c'-O-[CF(CF(CF_2X')-CF_2-O]_{n'}-CF=CF_2 \qquad (III)$$

where:

Y' is —F, —Cl or Br;

a' and b' are independently 0–3;

c is 0 or 1;

provided a'+b'+c' is not equal to 0;

n' is 0–6;

R$_f$ and R$_{f'}$ are independently selected from the group consisting of —Br, —Cl, —F, perfluoroalkyl radicals having from about 1 to about 10 carbon atoms, and chloroperfluoroalkyl radicals having from 1 to about 10 carbon atoms; and X' is —F, —Cl, —Br, or mixtures thereof when n'>1.

21. The membrane/electrode combination of claim 1 wherein an ionomer is distributed among the catalytically active particles to bond them together.

22. The membrane/electrode combination of claim 1 wherein an electrically conductive metal is distributed among the catalytically active particles.

23. The membrane/electrode combination of claim 22 wherein the electrically conductive particles are selected from the group consisting of silver, nickel, tantalum, platinum, and gold.

24. The membrane/electrode combination of claim 1 wherein the catalytically active particles are in a layer having a thickness as low as about 20 microns.

25. The membrane/electrode combination of claim 1 wherein the catalytically active particles are in a layer having a thickness as low as about 5 microns.

* * * * *

UNITED STATES PATENT AND TRADEMARK OFFICE
CERTIFICATE OF CORRECTION

PATENT NO. : 4,752,370

DATED : June 21, 1988

INVENTOR(S) : James W. McMichael and Robert D. Door

It is certified that error appears in the above-identified patent and that said Letters Patent is hereby corrected as shown below:

1st page, References Cited, 1st column; change 1st occurrence of "Suhara et al ........ 204/98" to --Munekata et al ........ 560/183-- for Reference "4,209,635".

1st page, References Cited, 2nd column; change "260/45F" to --260/456F-- for Reference "4,337,211".

Col. 1, lines 10-11; move "ity of electrically conductive," to immediately after "plural".

Col. 4, line 6; change "120" to --130--.

Col. 6, line 11; change "632,498;" to --3,632,498;--.

Col. 7, line 29; change 2nd occurrence of "$R_f$" to --$R_{f'}$--.

Col. 7, line 52; insert --and fluorochloroalkyl radicals having from 1 to about 10 carbon atoms.-- after "atoms".

Col. 8, line 2; change "perfluroalkyl" to --perfluoroalkyl--.

Col. 10, line 25; insert a new paragraph after "hildebrands".

Col. 12, line 46, Claim 1; change "physcial" to --physical--.

Col. 13, lines 14-15, Claim 11; delete "of combinaiton".

UNITED STATES PATENT AND TRADEMARK OFFICE
CERTIFICATE OF CORRECTION

PATENT NO. : 4,752,370
DATED : June 21, 1988
INVENTOR(S) : James W. McMichael and Robert D. Door It is certified that error appears in the above-identified patent and that said Letters Patent is hereby corrected as shown below:

Col. 13, line 53, Claim 18; change "$CF_f$" to --$CFR_{f'}$--.

Col. 14, line 14, Claim 18; insert --$n \geq 1$;-- after "when".

Col. 14, line 29, Claim 20; change "$(CFR)_2$" to --$(CF)_2$--.

Col. 14, line 30, Claim 20; delete "(CF".

Col. 14, line 33, Claim 20; change "Br" to -- -Br --.

Signed and Sealed this

Twenty-fifth Day of April, 1989

Attest:

DONALD J. QUIGG

Attesting Officer

Commissioner of Patents and Trademarks